United States Patent [19]

Karnowski

[11] Patent Number: 5,289,529
[45] Date of Patent: Feb. 22, 1994

[54] MEANS FOR IMPROVING THE DYNAMIC RANGE OF AN ANALOG/DIGITAL CONVERTER IN A DIGITAL TELEPHONE ANSWERING MACHINE

[75] Inventor: Mark Karnowski, Garden Grove, Calif.

[73] Assignee: PhoneMate, Inc., Torrance, Calif.

[21] Appl. No.: 592,772

[22] Filed: Oct. 4, 1990

[51] Int. Cl.[5] .......................... H04M 1/60; H04M 1/65
[52] U.S. Cl. .................................... 379/88; 379/395; 381/106
[58] Field of Search ................. 379/88, 395, 347, 414; 381/106, 108

[56] References Cited

U.S. PATENT DOCUMENTS

| 3,745,261 | 7/1973 | Friedman | 379/395 X |
| 4,406,923 | 9/1983 | Burne, III et al. | 381/108 |
| 4,506,113 | 3/1985 | Blomley | 379/347 X |
| 4,630,302 | 12/1986 | Kryter | 381/57 |
| 4,794,638 | 12/1988 | Millet | 379/88 |
| 4,928,307 | 5/1990 | Lynn | 379/395 |

FOREIGN PATENT DOCUMENTS 0182635 10/1984 Japan .................................... 379/395

OTHER PUBLICATIONS

"Audio compounder squelches hiss and hum better than Dolby system", *Electronics*, Feb. 15, 1979, pp. 70, 72.
*Voice Technology*, Teja and Gonnella, Reston Publishing Co., Inc., Reston, Va., 1983, pp. 26–31.

*Primary Examiner*—Thomas W. Brown
*Attorney, Agent, or Firm*—Frishauf, Holtz, Goodman & Woodward

[57] ABSTRACT

An automatic gain controller uses a voltage controlled amplifier coupled to an averaging circuit that feeds back into the amplifier. The averaging circuit supplies a controlling voltage that keeps the amplifier output voltage tending towards a certain reference level. When the amplifier output is generally high, the averaging circuit output is also generally high and the reverse is also true for low signals. For low averaging circuit output voltages corresponding to low intensity signals, amplification of the signal by the amplifier is enhanced or augmented. The result is to boost the signal of low intensity signals significantly, compressing the dynamic range of an incoming signal received from a phone. This reduces the variance of an incoming phone line signal for an analog to digital converter (ADC) in a digital telephone answering device, and the effective dynamic range of the ADC is closer to optimum. A scaling circuit couples the signal from the automatic gain controller to the ADC.

30 Claims, 1 Drawing Sheet

MEANS FOR IMPROVING THE DYNAMIC RANGE OF AN ANALOG/DIGITAL CONVERTER IN A DIGITAL TELEPHONE ANSWERING MACHINE

BACKGROUND

1. Field of the Invention

The present invention relates to telephone answering devices and sound signal manipulation, and more particularly to the means by which a voice signal may be better presented to an analog/digital converter in a digital telephone answering device.

2. Description of the Prior Art

Telephone answering devices (TADs) are well known and in common use throughout the United States. Recently, advancement in digital technology has influenced recent TAD design and production. Instead of using cassette tapes to record outgoing and incoming messages, TADs are now available that use digital memory storage as a recording medium. Digital memory storage, namely random access memory (RAM), requires the conversion of an analog voice signal generated by a microphone or phone line into a digital representation. This is not difficult, but does require a good clear signal for optimum performance.

Such good clear signals are easily generated by microphones attached to digital telephone answering devices (DTADs), but the same is not true for signals coming into the DTAD from the phone line. On present phone lines, voice signals from telephone lines have a dynamic range of about thirty or more decibels (dB). For this reason, some calls can be very clear while others can be faint or have much noise.

Standard analog to digital converters are eight bits "wide" and have a dynamic range of forty-eight decibels. Between the dynamic ranges of the phone line and the analog to digital converter is a difference of eighteen decibels. Thus, under worst case conditions, the effective dynamic range of the ADC would be limited to only eighteen dB. This would have severe voice quality consequences that make an eight bit ADC unusable. Conversely, if the dynamic range of the signal from the phone line was reduced to three dB, the ADC would have forty-five dB with which to work and eight bits would easily handle voice signals from the phone line.

Beyond the limitations of current eight bit ADCs with respect to phone line dynamic range, the use of sophisticated speech compression algorithms require clear signals for their operation. Without such clear signals, the use of speech compression in the storing and retrieving the digitized analog signal results in an overall degradation of the voice signal. The signal degradation is not experienced by clear signals, but only those that suffer a significant loss of integrity upon digitization, such as low level signals.

When an eight bit ADC attempts to convert a phone line signal from analog to digital representation, the signals that are close to the ADCs input range are fairly well converted. When the whole of the signals transmitted to a DTAD over the phone line are of low intensity, the digital signal created by the ADC will lose some of the information contained in the analog signal. As the analog signal from the phone line is of low intensity, only a small portion of the ADC's digitizing range is used. This leads to what is called "quantization noise" in the digitized signal and is noticeable when the digital signal is converted back into an analog signal upon playback. The quantization noise arises from the resolution available in an eight bit ADC. When the signal is low, the audio signal resolving power of an eight bit ADC is limited. In an extreme example of a faint signal, only four or five of the eight bit ADC's two hundred and fifty-six quantizing levels might be used for the whole of the signal.

When an analog signal is sampled by the ADC, the ADC changes the analog signal into the closest digital representation available, even though there is some disparity between the analog signal and its closest available digital representation. The more bits available to the ADC, the closer the digital representation will be to the analog signal. The loss of part of the analog signal experienced in digitization is called the quantization noise and can be modeled as the introduction of an unwanted signal when the analog signal is quantified by digitization. When the quantization noise of a digitized analog signal is high, the resulting analog signal created when the digital signal is played back has a tendency to become "granular" and reveal the discrete levels that were used to digitally record the original analog signal. When an analog signal dwells within a short range of digital levels, the quantization noise can be severe. Analog signals of low intensity with respect to the input range of the ADC have the tendency to dwell within such a short range.

One method that can be used to combat quantization noise is to increase the resolution of the ADC. By increasing the number of bits, an ADC has more levels available with which an analog signal can be represented. Where the number of bits can be increased, this is a successful means for reducing quantization noise. As a result, most DTADs demand that a twelve of thirteen bit ADC be used. The use of larger ADC's having more bits demands greater cost and more sensitive circuitry compared with eight bit systems. Additionally, many single chip microcontrollers used in DTADs have built-in ADCs and these ADC's are usually limited to only eight bits. If an eight bit ADC could be used, circuitry would be eliminated and costs could be reduced.

Another method is merely to use a fixed gain amplifier. In Millet, U.S. Pat. No. 4,794,638, issued on Dec. 27, 1988, a fixed gain amplifier is used. As the gain is fixed, no increase in the effective dynamic range is realized. High and low intensity signals are amplified by the same amount. Upon digitization, no improvement is seen in the loss of low intensity signals and quantization noise is not diminished.

In light of the decreased expense and design considerations, there is a need for a method by which eight bit ADC's may be used in DTADs with limited quantization noise for low intensity signals.

SUMMARY OF THE INVENTION

The present invention lies in the use of an automatic gain controller in the form of a voltage controlled amplifier coupled to an averaging circuit that feeds back into the voltage controlled amplifier. The averaging circuit supplies the controlling voltage that keeps the amplifier output voltage tending towards a certain reference level. When the output of the amplifier is generally high, the output of the averaging circuit is also generally high and the reverse is also true for low signals. The averaging circuit output is fed back to the amplifier. For high averaging circuit output voltages corresponding to signals of high intensity, amplification of the signal by the amplifier is diminished or subdued. For low averaging circuit output voltages corresponding to low intensity signals, amplification of the signal by the amplifier is enhanced or augmented. The result is to boost the signal of low intensity signals significantly, compressing the dynamic range of the incoming phone signal. This reduces the variance of an incoming phone line signal for the analog to digital converter (ADC) present in a digital telephone answering device (DTAD). With reduced variance at its input signal, the effective dynamic range of the ADC is closer to its optimum dynamic range. For coupling with an ADC, a scaling circuit intermediates the signal from the automatic gain controller to the ADC.

OBJECTS OF THE INVENTION

It is an object of the present invention to provide means for expanding the effective dynamic range of an analog to digital converter used in a digital telephone answering device.

It is another object of the present invention to provide such means that are cost effective.

It is still another object of the present invention to provide such means that allow the use of an eight bit analog to digital converter.

It is yet another object of the present invention to provide such means that are simple and easy to use.

These and other objects and advantages of the present invention will be apparent from a review of the following specification and accompanying drawings.

DETAILED DESCRIPTION OF THE PREFERRED EMBODIMENTS

Figure 1:
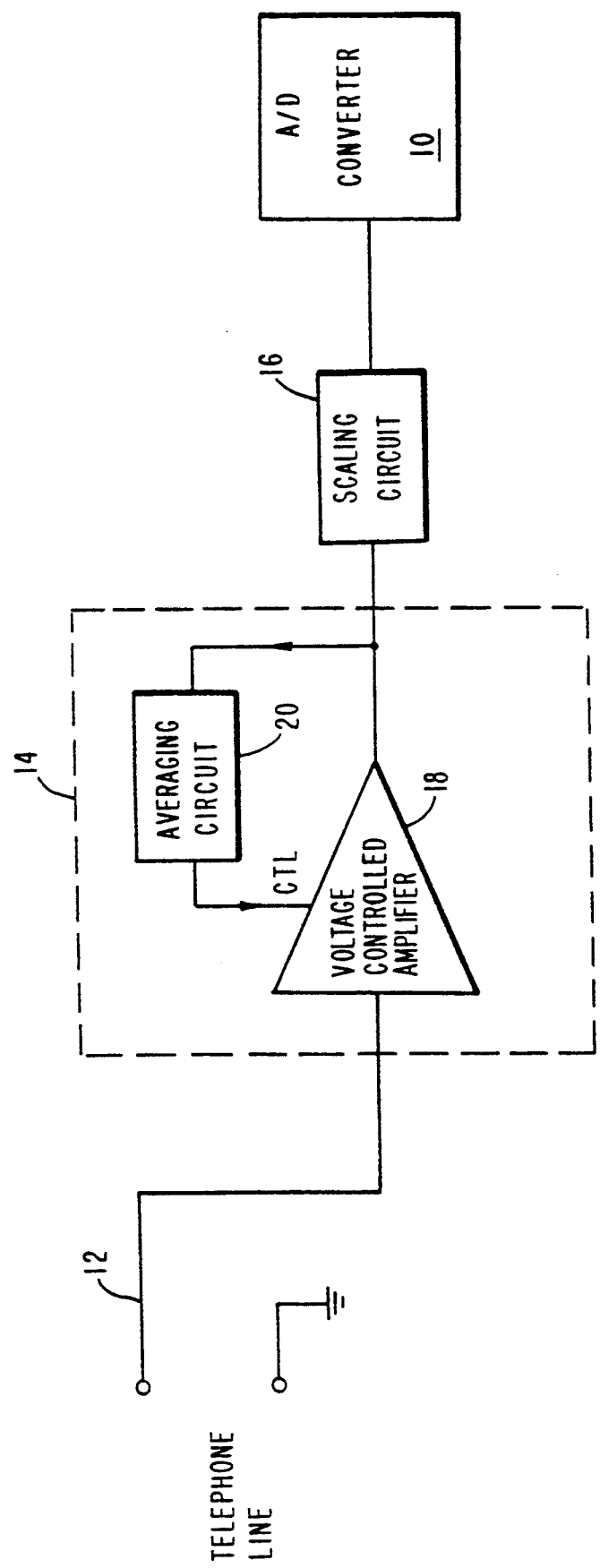
FIG. 1 is a block diagram of the present invention showing the components and their relative positions.

As shown in FIG. 1, an analog to digital converter (ADC) 10 of a digital telephone answering device (DTAD) is coupled by its input to a phone line 12. The phone line 12 is connected to the input of an automatic gain controller (AGC) 14. The output of the AGC 14 is connected to the input of a scaling circuit 16. The output of the scaling circuit 16 is connected to the input of the ADC 10.

The AGC 14 is comprised of two components: a voltage controlled amplifier 18 and an averaging circuit 20. The voltage controlled amplifier 18 is connected by its input to the phone line 12. The output of the voltage controlled amplifier 18 is connected to the input of the averaging circuit 20 and the scaling circuit 16. The output of the averaging circuit 20 is connected to the voltage controlled amplifier 18 and serves as the voltage controlling the voltage controlled amplifier 18. Both voltage controlled amplifiers and averaging circuits are well known in the art.

The voltage controlled amplifier 18 amplifies the output signal of the phone line 12 according to the voltage applied on voltage controlled amplifier 18 by the averaging circuit 20. The voltage applied by the averaging circuit 20 is directly dependent upon the output of the voltage controlled amplifier 18. In this way, the voltage controlled amplifier 18 controls itself by feedback through the averaging circuit 20.

The averaging circuit 20 is present to prevent instantaneous response by the voltage controlled amplifier 18 to its own signal. With the averaging circuit 20, the long term average level of the phone line 12 signal is amplified rather than individual signals. The averaging circuit 20 feeds back to the voltage controlled amplifier 18 a signal representative of the voltage controlled amplifier 18 output for the previous two to four seconds.

The voltage controlled amplifier 18 amplifies the phone line 12 signal most when a low voltage is applied by the averaging circuit 20 upon the voltage controlled amplifier 18. A low voltage is applied by the averaging circuit 20 when the output signal of the voltage controlled amplifier 18 is low. This will cause the gain of voltage controlled amplifier 18 to increase, which will in turn increase the level of the output of the averaging circuit 20. Eventually, the system will stabilize with an amplification factor that is appropriate for the level of the input signal of the amplifier 18.

When a high voltage is applied by the averaging circuit 20 upon the voltage controlled amplifier 18, the voltage controlled amplifier 18 amplifies the phone line 12 signal least. A high voltage is applied by the averaging circuit 20 upon the voltage controlled amplifier 18 when a high signal is coming from the phone line 12. When the voltage controlled amplifier 18 is not amplifying due to the high signal voltage from the averaging circuit 20, the phone line 12 signal itself is the source of high signals and passes through the voltage controlled amplifier 18 relatively unaltered.

As low signals are amplified by the voltage controlled amplifier 18 while high signals are not amplified, the automatic gain controller 14 amplifies low, but not high signals. This tends to "pick up the bottom" of incoming signals from the phone line 12. When these signals are used as input to the ADC 10, low signals that would have experienced difficulty being represented digitally become more susceptible to digitization. The low signals are brought up to a higher level, medium signals are brought up to a somewhat higher level, and high signals are left at their original high level. The dynamic range of the incoming phone line 12 signal is compressed, making it more susceptible to digitization without quantization noise being as present upon playback.

The scaling circuit 16 present between the AGC 14 and the ADC 10 serves to mediate the signals from AGC 14 output for the ADC 10 input. The AGC 14 output voltage signal may be significantly less than or more than the optimum input signal level preferred by the ADC 10. In order to match the AGC 14 output signal with the ADC 10 input, a scaling circuit 16 is used that amplifies or diminishes the AGC 14 output by a constant factor for optimum ADC 10 input.

While the present invention has been described with regards to particular embodiments, it is recognized that additional variations of the present invention may be devised without departing from the inventive concept.

What is claimed is:

1. A circuit means, in a telephone answering device having an analog to digital converter, for variably amplifying input voice signals received from a phone line, said circuit means comprising:

feedback controlled amplifier means for variably amplifying voice signals received from said phone line for input to the analog to digital converter, said feedback controlled amplifier means having a voice signal input, means for coupling said voice signal input to the phone line, a voice signal output, means for coupling said voice signal output to an input of said analog to digital converter, and a control signal input for receiving a control signal which controls the amplification of said feedback controlled amplifier means;

averaging circuit means having an input and an output, said input of said averaging circuit means being coupled to said voice signal output of said feedback controlled amplifier means, for producing a control signal at said output thereof, said control signal representing an average of the signal at said voice signal output over a period of time which is greater than two seconds; and said output of said averaging circuit means being coupled to said control signal input of said feedback controlled amplifier means for supplying said control signal to said feedback controlled amplifier means to control the amplification of said voice signals received from said phone line.

2. The circuit means of claim 1, wherein said means for coupling said voice signal output to said analog to digital converter comprises a scaling circuit having an input coupled to said voice signal output of said feedback controlled amplifier means and an output coupled to said analog to digital converter, said scaling circuit amplifying or diminishing a signal present at its input by a constant factor so that the signal at said voice signal output of said feedback controlled amplifier means is scaled to said analog to digital converter input.

3. The circuit means of claim 1, wherein said period of time comprises a time period of two to four seconds.

4. The circuit means of claim 1, wherein said feedback controlled amplifier means includes means for increasing the amplification thereof responsive to a low level control signal at said control signal input, and for reducing the amplification level responsive to a higher level control signal at said control signal input thereof.

5. The circuit means of claim 4, wherein an increase in voltage at said control signal input causes a decrease in gain of said feedback controlled amplifier means, and a decrease in voltage at said control signal input causes an increase in gain of said feedback controlled amplifier means.

6. The circuit means of claim 1, wherein said feedback controlled amplifier means is a voltage controlled amplifier means.

7. The circuit means of claim 6, wherein an increase in voltage at said control signal input of said feedback controlled amplifier means causes a decrease in gain of said feedback controlled amplifier means, and a decrease in voltage at said control signal input causes an increase in gain of said feedback controlled amplifier means.

8. The circuit means of claim 2, wherein said feedback controlled amplifier means is a voltage controlled amplifier means.

9. The circuit means of claim 8, wherein an increase in voltage at said control signal input of said feedback controlled amplifier means causes a decrease in gain of said feedback controlled amplifier means, and a decrease in voltage at said control signal input causes an increase in gain of said feedback controlled amplifier means.

10. An automatic gain circuit, in a telephone answering device having an analog to digital converter, said automatic gain circuit comprising:

voltage controlled amplifier means for variably amplifying voice signals received from a phone line for input to the analog to digital converter, said voltage controlled amplifier means having a voice signal input, means for coupling said voice signal input to the phone line, a voice signal output, means for coupling said voice signal output to said analog to digital converter, and a control voltage input means for receiving a control voltage for controlling the amplification of said voltage controlled amplifier means, such that an increase in voltage at said control voltage input means causes a decrease in the gain of said voltage controlled amplifier means and a decrease in voltage at said control voltage input means causes an increase in the gain of said voltage controlled amplifier means; and averaging circuit means having an input and an output, said input of said averaging circuit means being coupled to said voice signal output of said voltage controlled amplifier means, for producing a control voltage at said output thereof, said control voltage having a voltage level representing an average of the signal present at the input of said averaging circuit means for a preceding time period of at least two seconds, said control voltage being coupled to said control voltage input means of said voltage controlled amplifier means.

11. The automatic gain circuit of claim 10, wherein said means for coupling said voice signal output to said analog to digital converter comprises a scaling circuit having an input coupled to said voice signal output of said voltage controlled amplifier means and an output coupled to said analog to digital converter, said scaling circuit amplifying or diminishing a signal present at its input by a constant factor so that the signal at said voice signal output of said voltage controlled amplifier means is scaled to said analog to digital converter input.

12. The automatic gain circuit of claim 10, wherein said time period comprises a time period of two to four seconds.

13. The automatic gain circuit of claim 10, wherein said telephone answering device is a digital telephone answering device.

14. A circuit means, in a digital telephone answering device having an analog to digital converter, for variably amplifying input voice signals received from a phone line, said circuit means comprising:

feedback controlled amplifier means for variably amplifying voice signals received from said phone line for input to the analog to digital converter, said feedback controlled amplifier means having a voice signal input, means for coupling said voice signal input to the phone line, a voice signal output providing a variably amplified signal representative of the voice signals on said phone line, a control signal input for receiving a control signal which controls the amplification of said feedback controlled amplifier means, and feedback means coupled between said voice signal output and said control signal input for supplying the control signal to said control signal input for controlling the amplification of said feedback controlled amplifier means; and a scaling circuit coupling said voice signal output to an input of said analog to digital converter, said scaling circuit amplifying or diminishing a signal present at its input by a constant factor so that the signal at said voice signal output of said feedback controlled amplifier means is at an optimum level for input to said analog to digital converter.

15. The circuit means of claim 14, wherein said feedback means comprises averaging circuit means having an input and an output, said input of said averaging circuit means being coupled to said voice signal output of said feedback controlled amplifier means, and said output of said averaging circuit means being coupled to said control signal input of said feedback controlled amplifier means, for producing the control signal which corresponds to an average of the signal present at its input for a preceding time period of at least two seconds.

16. The circuit means of claim 14, wherein said period of time comprises a time period of two to four seconds.

17. The circuit means of claim 14, wherein said feedback controlled amplifier means increases the amplification thereof responsive to a low level control signal at said control signal input, and reduces the amplification level responsive to a higher level control signal at said control signal input thereof.

18. The circuit means of claim 17, wherein an increase in voltage at said control signal input causes a decrease in gain of said feedback controlled amplifier means, and a decrease in voltage at said control signal input causes an increase in gain of said feedback controlled amplifier means.

19. The circuit means of claim 14, wherein said feedback controlled amplifier means comprises a voltage controlled amplifier means.

20. A circuit means for improving the dynamic range of an analog to digital converter in a telephone answering device, said circuit means comprising:
  a feedback controlled amplifier having a first input from a telephone line, an output connected to both an analog to digital converter and to an averaging circuit, said averaging circuit having an output connected to a control input of said feedback controlled amplifier to form a feedback loop of said feedback controlled amplifier, said feedback controlled amplifier variably amplifying voice signals transmitted by said telephone line for input to said analog to digital converter in response to a signal at its control input;
  wherein said averaging circuit takes as input signals output from said feedback controlled amplifier, and outputs a second signal that is an average of its input signals taken over a time period of at least two seconds, said second signal being supplied to said control input of said feedback controlled amplifier.

21. The circuit means of claim 20, further comprising:
  a scaling circuit coupling said output of said feedback controlled amplifier to said analog to digital converter, said scaling circuit having an input coupled to said feedback controlled amplifier output and an output coupled to said analog to digital converter, said scaling circuit amplifying a signal present at its input by a constant factor so that a feedback controlled amplifier output signal is scaled to said analog to digital converter input.

22. The circuit means of claim 21, wherein a decrease in the signal level at said control input of said feedback controlled amplifier causes an increase in the gain thereof, and an increase in the signal level at said control input of said feedback controlled amplifier causes a decrease in the gain thereof.

23. The circuit means of claim 20, wherein said feedback controlled amplifier is a voltage controlled amplifier.

24. The circuit means of claim 23, further comprising:
  a scaling circuit coupling said output of said feedback controlled amplifier to said analog to digital converter, said scaling circuit having an input coupled to said feedback controlled amplifier output and an output coupled to said analog to digital converter, said scaling circuit amplifying a signal present at its input by a constant factor so that a feedback controlled amplifier output signal is scaled to said analog to digital converter input.

25. The circuit means of claim 24, wherein a decrease in the signal level at said control input of said feedback controlled amplifier causes an increase in the gain thereof, and an increase in the signal level at said control input of said feedback controlled amplifier causes a decrease in the gain thereof.

26. The circuit means of claim 20, wherein said time period comprises a time period of two to four seconds.

27. A circuit means for improving the dynamic range of an analog to digital converter in a telephone answering device, said circuit means comprising:
  a feedback controlled amplifier having a first input from a telephone line, and an output coupled to a scaling circuit means, said scaling circuit means having an output coupled to an input of the analog to digital converter, said feedback controlled amplifier variably amplifying voice signals transmitted by said telephone line for input to said scaling circuit; and
  said scaling circuit amplifying a signal present at its input by a constant factor so that its output signal is scaled to said analog to digital converter input.

28. The circuit means of claim 27, wherein said feedback controlled amplifier has a control input for receiving a control signal, and wherein a decrease in a signal level at said control input of said feedback controlled amplifier causes an increase in the gain thereof, and an increase in the signal level at said control input of said feedback controlled amplifier causes a decrease in the gain thereof.

29. The circuit means of claim 28, wherein said feedback controlled amplifier comprises an averaging circuit means for controlling the amplification thereof, said averaging circuit means being connected to said control input of said feedback controlled amplifier to form a feedback loop of said feedback controlled amplifier, said averaging circuit means taking as input signals output from said feedback controlled amplifier, and outputting a second signal that is an average of its input signals taken over a time period of at least two seconds, said second signal being coupled to said control input of said feedback controlled amplifier.

30. The circuit means of claim 29, wherein said time period comprises a time period of two to four seconds.

* * * * *